(12) United States Patent
Grandrud

(10) Patent No.: US 6,834,485 B2
(45) Date of Patent: Dec. 28, 2004

(54) INDEPENDENT POSITIVE REVERSE DRIVE MOWER WITH BRAKE LOCKOUT

(75) Inventor: Merlin H. Grandrud, Racine, WI (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 10/323,721

(22) Filed: Dec. 18, 2002

(65) Prior Publication Data

US 2004/0118097 A1 Jun. 24, 2004

(51) Int. Cl.$^7$ .............................................. A01D 69/10
(52) U.S. Cl. ....................................... 56/11.3; 56/11.6
(58) Field of Search .............................. 56/10.2 R, 10.5, 56/11.3, 11.6, DIG. 6

(56) References Cited

U.S. PATENT DOCUMENTS

| | | | |
|---|---|---|---|
| 2,272,287 A | * | 2/1942 | Baker et al. ............ 188/196 M |
| 2,718,154 A | * | 9/1955 | Mathson ........................ 474/5 |
| 3,367,459 A | * | 2/1968 | Rubin ...................... 192/224.1 |
| 3,539,040 A | * | 11/1970 | Edwards .................. 192/220.1 |
| 3,616,869 A | | 11/1971 | Rilling |
| 3,965,657 A | * | 6/1976 | Jespersen ................. 56/10.2 R |
| 4,007,815 A | * | 2/1977 | Acre ........................... 188/265 |
| 4,058,957 A | * | 11/1977 | Roseberry ..................... 56/11.3 |
| 4,558,558 A | | 12/1985 | Horner, Jr. et al. |
| 4,813,215 A | | 3/1989 | Chase et al. |
| 5,042,239 A | | 8/1991 | Card |
| 5,146,735 A | | 9/1992 | McDonner |
| 5,343,678 A | | 9/1994 | Stuart |
| 5,517,809 A | | 5/1996 | Rich |

* cited by examiner

Primary Examiner—Robert E. Pezzuto
Assistant Examiner—Alicia Torres
(74) Attorney, Agent, or Firm—Harness, Dickey & Pierce, P.L.C.

(57) ABSTRACT

A control apparatus for a lawn mower which includes two coupling members pivotable about a single axis. The coupling members are connected to a drive mechanism and a braking mechanism for the lawn mower. The lawn mower device has a drive configured to rotate a shaft in a first direction. A drive wheel is coupled to the shaft and is coupled to a driven wheel by a drive belt. A tensioning system is shown coupled to the drive belt. The tensioning system has a first idler plate configured to bias a first idler pulley against the drive belt when the drive is rotating the shaft in the first direction and a second idler plate configured to bias a second idler plate against the drive belt when the drive is rotating the shaft in a second direction. A brake mechanism is further coupled to the tensioning system. The brake mechanism is configured to resist the rotation of the driven wheel. A brake lockout is provided which resist the inadvertent engagement of the brake when the mower is driven in a reverse direction.

20 Claims, 3 Drawing Sheets

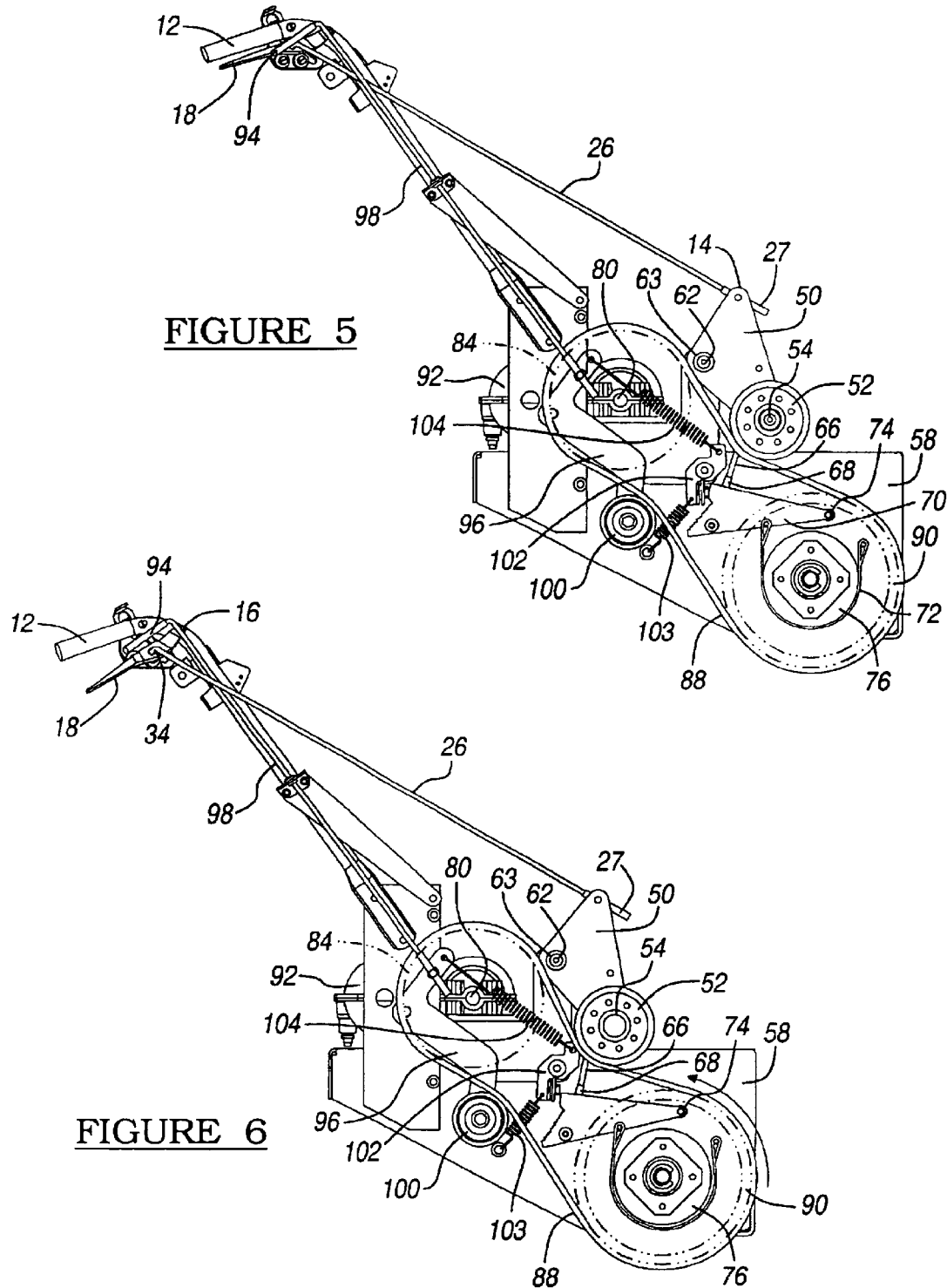

INDEPENDENT POSITIVE REVERSE DRIVE MOWER WITH BRAKE LOCKOUT

FIELD OF THE INVENTION

The present invention relates to a drive mechanism for a walk behind lawn mower and, more particularly, to a zero turn radius drive mechanism having incorporated forward/reverse and braking features incorporated into a belt driven drive system.

BACKGROUND OF THE INVENTION

Conventional commercial walk-behind turf care machines, such as walk-behind lawnmowers include a number of levers and linkages used to control machine operation. During routine operation, these machines must often be maneuvered around trees, flower beds and other obstacles quickly and with precision. Because these machines typically weigh several hundred pounds, it would be labor intensive, if not impossible, to operate and maneuver the turf care machines in such a manner for extensive periods of time without some type of operator assist device.

Therefore, commercial turf care machines are typically equipped with self-propelling drive mechanisms for driving the wheels of the machines. These drive mechanisms typically include a mechanism for transferring the driving torque from a source of power such as an internal combustion engine to at least two of the machine wheels, thereby turning the machine wheels and assisting the machine operator in both propelling and maneuvering the piece of equipment.

While both hydraulic and mechanical drive mechanisms have been commonly used in the past, belt driven drive mechanisms are being implemented in walk-behind turf care machines on an ever increasing basis due to the decrease in price and known reliability of such systems. Belt driven drive mechanisms have long been known to exhibit desirable characteristics such as allowing a machine operator to quickly switch among forward, neutral and reverse modes of operation.

A turf care machine operator manipulates a typical belt driven drive mechanism through a plurality of levers located on an operator/turf machine interface such as a pair of handle bars. These operator control systems typically include both belt tensioning and speed controls and enhance machine operability and maneuverability. Additionally, separate braking controls are provided which can readily be used to stop a moving self propelled mower. A typical belt tensioning control provides the machine operator with selective control among forward, neutral and reverse modes of operation, while a typical speed control provides the operator with a control for regulating the maximum forward speed at which the machine can be operated. Unfortunately, application of reverse drive forces through the drive belt when the mower can inadvertently apply the braking system, thus preventing movement of the mower.

While present belt driven drive operator control systems such as those described above exhibit sufficient performance characteristics, such systems require numerous linkages between the components to implement, thus increasing turf care machine cost. It is also desirable to provide more ergonomic arrangements for the operator controls to facilitate ease of operation and provision of operation instructions.

SUMMARY OF THE INVENTION

It is an object of the present invention to overcome the deficiencies as described in the prior art. In this regard, shown is a lawn mower device having a drive configured to rotate a shaft in a first and second direction. A drive wheel is coupled to the shaft and is coupled to a driven wheel by a drive belt. A tensioning system is shown coupled to the drive belt. The tensioning system has a first idler plate configured to bias a first idler pulley against the drive belt when the drive is rotating the shaft in the first direction and a second idler plate configured to bias an idler pulley against the drive belt when the drive is rotating the shaft in a second direction. A brake mechanism is further coupled to the drive system. The brake mechanism is configured to resist the rotation of the driven wheel. A lockout plate is configured to prevent inadvertent application of the brake when the drive is applying forces in the second direction.

Another embodiment of the present invention, the lockout mechanism and second idler plates are coupled together by a linkage. Rotation of the second idler plate to bias the second idler pulley against the belt rotates the lockout plate and, therefore, prevents inadvertent engagement of the brake mechanism.

In another embodiment of the present invention, a lawn mower having a drive mechanism configured to drive a shaft in a first and second direction is disclosed. A drum pulley is coupled to the shaft. A drive wheel is coupled to the drum pulley by a flexible member or flexible drive belt. A tensioning system is configured to apply forces to a first slack side of the flexible drive belt when the drive shaft is driven in a first direction and apply forces to a second slack side of the flexible drive belt when the drive shaft is driven in a second direction. A braking system is further provided which is -operable to inhibit the rotation of the driven wheel. The braking system is actuated through the tensioning system. A lockout mechanism is configured to prevent inadvertent application of the brake when the drive is applied in the second direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 represents the drive mechanism in full reverse; and

FIG. 6 represents the drive mechanism converting from the reverse to the neutral condition.

DETAILED DESCRIPTION OF THE PREFERRED EMBODIMENTS

The following description of the preferred embodiment is merely exemplary in nature and is in no way intended to limit the invention, its application, or uses.

Figure 1:
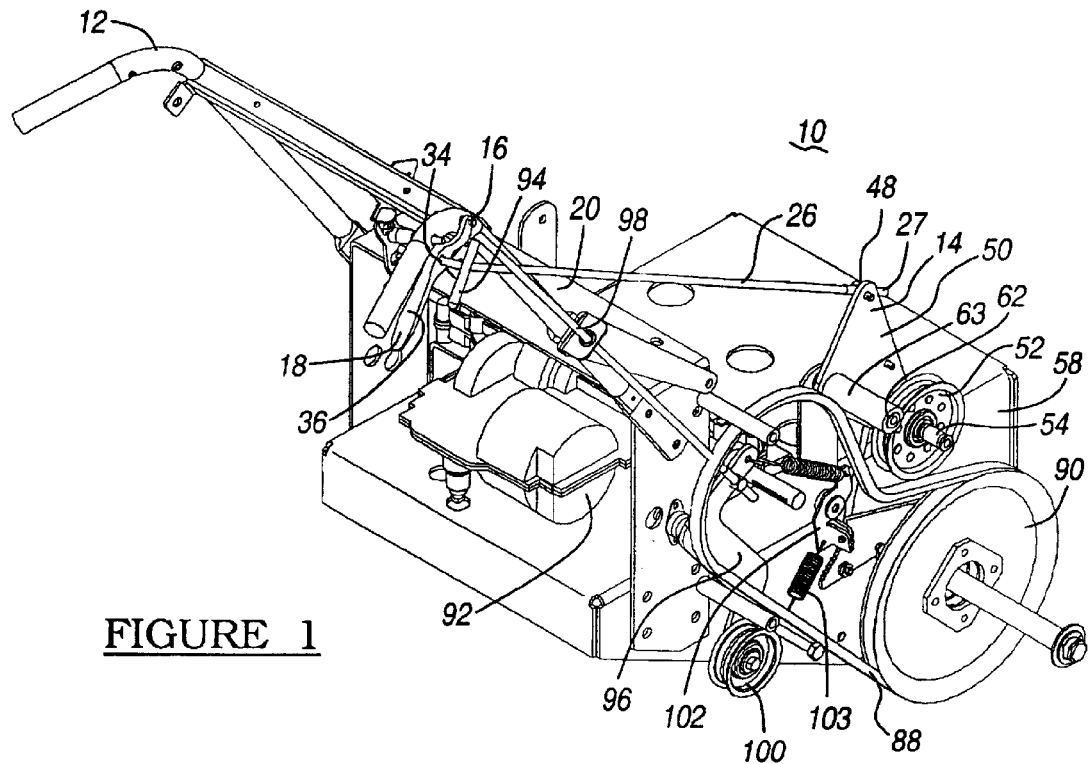
FIG. 1 represents a rear perspective view of the mower according to the present invention.

Referring now to the figures and more particularly to FIG. 1, a lawn mower control device constructed in accordance with one form of the invention is indicated generally at 10. A handle 12 supports both a pivotable right control assembly 13 and a pivotable left control assembly between the ends of the assemblies. In the most preferred form of the invention, the assembly 13 is supported by the handle 12 substantially at or near a pivot point 16 of the assemblies 13. The right control assembly 13 and the left control assembly are mirror images of each other and are independently operable from each other. Accordingly, the details of the right control assembly 13 which are discussed herein also apply to the left control assembly which operates in a substantially identical fashion to the right control assembly 13 in this embodiment.

The handle 18 of control assembly functions to regulate the drive mechanisms 14 and the right wheel. The right control assembly controls the drive mechanism 14 by regulating the movement of the first idler late 50.

As shown in FIG. 1, the right control assembly 13 preferably comprises a handle member 18 connected to a handle 12 at the pivot point 16 by a pin or other conventional techniques. While a handle member 18 is described for nonlimiting illustrative purposes, other shapes such as elongate members, rectangles, polygons, and ellipses can be used equivalently. The handle member 18 is connected to an adjustable control rod 26 and configured to be pulled against the handle 12, which regulates displacement of the handle member 18.

The handle 18 is shaped to generally conform to the shape of upper portion 36 of the handle 18. This enables the operator to comfortably and easily retain the handle member 18 in a position adjacent to handle 12. Clockwise pivoting movement of the right control assembly 13 (as viewed in FIG. 3) is limited by the lower portion of the handle 12.

The length of the adjustable control rod 26 can be adjusted by a conventional turnbuckle mechanism 27. The adjustable control rod 26 is pivotally engaged with a lever hole 34 disposed in the handle 18. A conventional pin retains the adjustable control rod 26 in a pivotal engagement and also enables quick and simple length change of the adjustable control rod 26.

Figure 2:
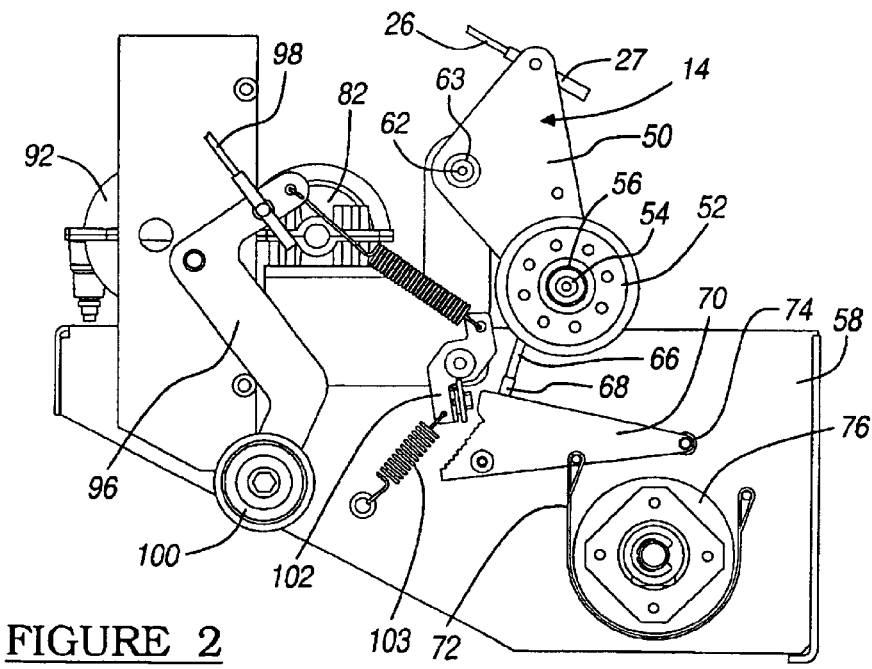
FIG. 2 represents a side view of the drive mechanism according to the teachings of the present invention.
Figure 3:
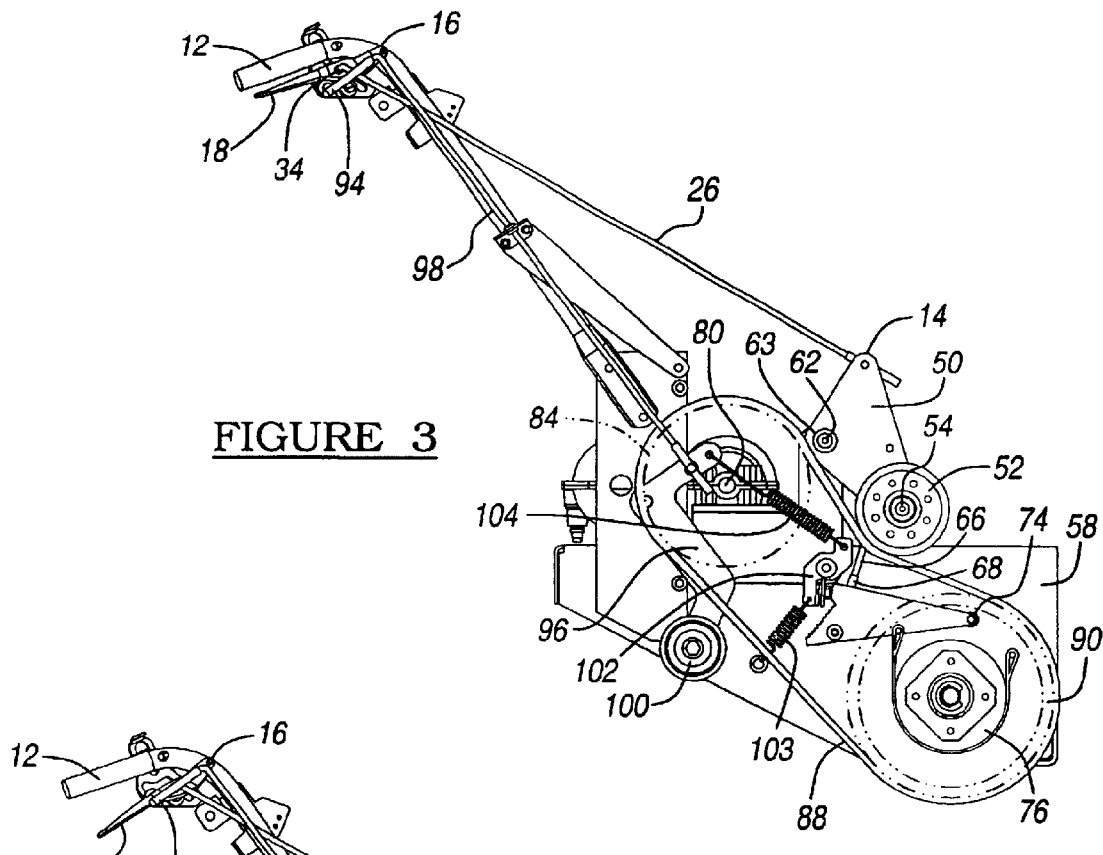
FIG. 3 represents the drive mechanism in a idle/brake condition.

As can be best seen in FIG. 2 or 3, the lower end 48 of the adjustable control rod 26 is pivotally connected to a first idler plate 50. The lower end 48 is retained in pivotal engagement with the first idler plate 50 by the conventional pin, and functions to translate movement of the handle 18 into the drive mechanism 14.

An idler pulley 52 is mounted to the first idler plate 50 by an idler bolt 54. The idler bolt 54 is inserted through an idler bearing 56 about which the idler pulley 52 rotates. The idler pulley 52 moves with the first idler plate 50 as the idler plate 50 pivots in response to movement of the adjustable control rod 26.

The idler plate 50 is pivotally connected to a housing 58 by a carriage bolt 62 through a bushing connected to the idler plate 50. The bolt 62 is first inserted through a safety guard which helps prevent entanglement in a drive belt 88. The idler plate 50 is biased in a clockwise or drive direction (as viewed in FIG. 2) by a spring (not shown) which is attached between the idler plate 50 and the housing 58. A brake control rod 66 is inserted into and pinned to a front portion of the idler plate 50 for pivotal engagement therewith. The lower brake rod portion 68 is connected to a brake arm 70 which can engage a brake band 72 as shown in FIGS. 1, 2 and 3.

As the brake control rod 66 is moved upward by counterclockwise rotation of the idler plate 50, the brake arm 70 rotates about a brake arm pivot 74 as shown in FIGS. 2 and 3. This rotation causes the brake band 72 to tighten until the brake band 72 engages a brake drum 76 disposed generally within the interior of the brake band 72. The brake band 72 comprises conventional material with a relatively high coefficient of friction so that the contact between the brake band 72 and brake drum 76 produces high frictional losses. This frictional engagement resists rotation of the brake drum 76, thereby resisting rotation of a drive wheel connected to the brake drum 76.

As shown in FIG. 3, a drive shaft 80 (which can be connected to a transmission, a hydrostatic motor or other conventional drive mechanism 82) is connected to a drive pulley 84. The drive shaft 80 is preferably inserted through a drive bearing 86 located between the drive pulley 84 and the drive mechanism 82. The drive pulley 84 engages a drive belt 88 which in turn engages a driven wheel pulley 90. The drive wheel pulley 90 is attached to the driven wheel for rotation therewith.

As shown in FIGS. 1 and 3, in a condition when no external forces are applied to the lawn mower control assembly 13, the spring force from the spring acting on the idler plate 50 applies the forces on the drive belt 88. Accordingly, the drive belt 88 engages the drive pulley 84 and drive wheel pulley 90, thereby providing a forward drive configuration. Simultaneously, the spring force causes the brake arm 70 to disengage the brake band 72 with the brake drum 76, thereby allowing movement of the lawn mower. The braking force can be increased by pivoting the handle member 18 in a clockwise direction as viewed in FIG. 2. This pivoting is typically induced by the operator pulling on the upper portion of the handle member 18, and this motion is an intuitive reaction when the operator wants to hold the lawn mower in place. The pivoting action overcomes the spring force produced by the spring thereby further removing forces on the drive belt 88 and tightening the brake band 72 on the brake drum 76.

As shown in FIGS. 1 and 3, when a gear box selector (not shown) places the drive mechanism 82 in a forward gear, releasing the handle member 18 away from the handle 12 causes the first idler pulley 52 to engage the drive belt 88 and increase the tension thereof. This engagement (which is adjustable by changing the length of the adjustable control rod 26) gradually ceases the slippage between the drive belt 88, the drive pulley 84 and the drive wheel pulley 90. Simultaneously, the brake arm 70 is moved to relax the brake band tension, thereby allowing forward movement in response to the driving force resulting from engagement with the drive belt 88 of the drive pulley 84 and drive wheel pulley 90. Once again, this feature comports well with ergonomic engineering principles by actuating forward drive wheel movement in response to a forward movement of the lever.

Further, when the operator applies a pulling force to only the handle 18 of right control assembly 13, driving forces are actuated only on the right side of the mower. This causes the mower to turn left if the left control assembly is in the idle or brake position. Accordingly, this embodiment of the invention provides intuitive and predictable control of the lawn mower.

Figure 4:
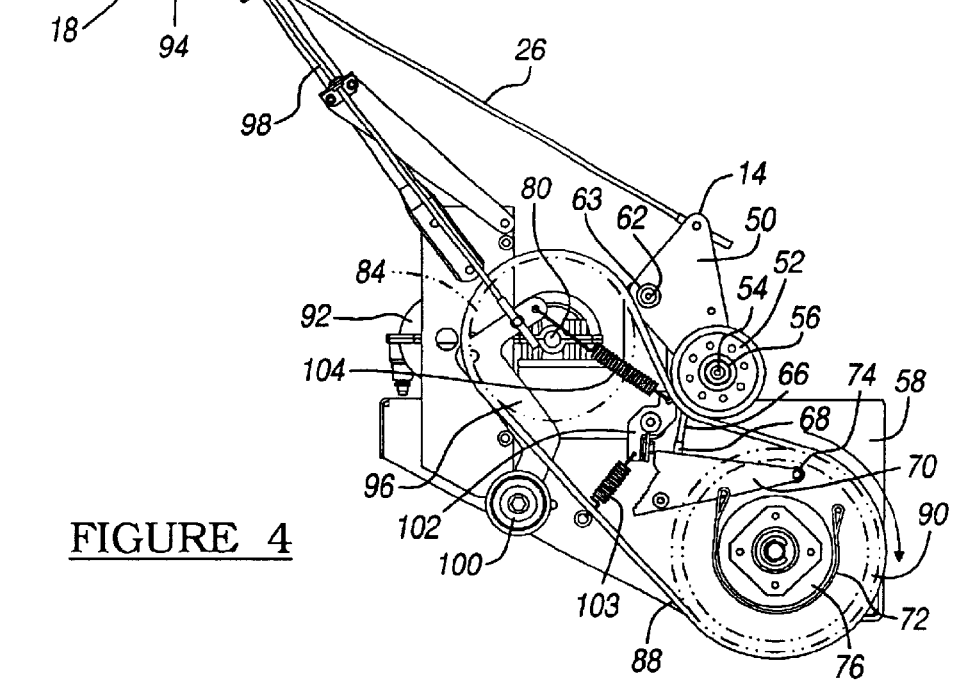
FIG. 4 represents the drive mechanism in an full forward condition.

As shown in FIGS. 1 and 4, when the gear box selector places the drive mechanism 82 in a reverse gear, pulling up on the lever 94 induces the same mechanical action as described for the forward drive activation. The engagement of idler 100 tends to cause the counter clockwise rotation of idler pulley 52, thereby engaging the brake mechanism. Because the drive pulley 84 is now rotating in the opposite direction due to the position of the gear box selector 92, rotation of the drive wheel causes the lawn mower to back up in response to the pulling force applied by the operator. In this way, motions which are intuitive to the operator actuate the corresponding movement of the lawn mower. Additionally, if the lawn mower begins to overtake the operator, the operator can stop pulling on the handle 12. This disengages drive belt 88 and engages brake band 72 on brake drum 76.

A second handle 94 is coupled to a second idler plate 96 by a second adjustment rod 98. The adjustment rod 98 is pivotally coupled to the second idler plate 96 and functions to control the engagement of second idler pulley 100 with drive belt 88. Coupled to the second idler plate 96 is a brake lockout mechanism 102 which functions to engage brake arm 70 and prevent inadvertent engagement of the brake band 72. The brake lockout mechanism 102 is rotatably coupled to the frame.

FIG. 4 depicts the drive mechanism 102 with drive pulley 84 and driven pulley 90 being shown in phantom. The driven pulley 90 is coupled to a wheel. The drive mechanism functions to drive the driven pulley 90 in a forward and rearward direction. In this regard, the flexible drive belt 88 is disposed about the drive and driven pulley 84 and 90.

The tensioning system is coupled to the flexible drive belt 88 and has a first idler arm or idler plate 50 which is configured to bias the first idler pulley against the flexible drive belt 88 when the drive is rotating in a forward direction. The tensioning system has a second idler plate or arm 96 configured to bias a second idler pulley 100 against the flexible drive belt 88 when the drive is rotating the shaft in a reverse direction. In this regard, the tensioning system is configured to apply tension to the first slack side of the flexible drive belt 88 when the drive shaft is driven in a first direction and apply tension to the second slack side of the flexible drive belt 88 when the shaft is driven in a second direction.

As can be best seen in FIG. 4, the second idler plate 96 and brake lockout mechanism 102 are coupled together by a linkage 104. This linkage 104, in the form of a coil spring, configures the tensioning system so that when the second idler plate 96 biases the second idler pulley 100 into the flexible drive belt 88, it rotates the brake lockout mechanism 102 against the brake plate 70 so as to prevent engagement of brake band 72 away from brake drum 76 by preventing rotation of the first idler plate 50. Additionally, the lockout mechanism 102 has a second spring 103 which functions to disengage the brake arm 70 from the lockout mechanism 102.

FIGS. 3-6 describe the operation of the mower. FIG. 3 depicts the drive mechanism in a idle or brake position. As can be seen, the handle 18 of the right control mechanism is in full-up position. This positions the first idler plate 50 so the first idler pulley 52 is in non-engaging position with respect to the flexible drive belt 88. In this position, the flexible drive belt 88 is loose and no forces can be transmitted to the driven pulley 90 from the drive pulley 84. Further, as can be seen in the full-up position, the friction band 72 is engaged about brake drum 76.

As best seen in FIG. 6, activation of lever 94 rotates the second idler plate 96 and, therefore, second idler pulley 100 into the slack side of the belt 88. Rotation of the driven pulley 90 rotates the brake drum 76. To prevent inadvertent engagement of the brake band 72, rotation of idler plate 96 applies forces to the brake lockout mechanism 102 which rotates brake lockout mechanism 102 about its pivot to engage teeth formed on the brake plate 70.

As seen in FIG. 2, lockout mechanism 102 engages brake plate 70 to prevent inadvertent engagement between the brake band 72 and brake drum 76. The release of lever 94 returns the second idler plate 96 into its non-engaged position. Spring coupling 105 allows disengagement of the brake lockout mechanism 102 from the brake plate 70. As best seen in FIG. 6, when the handle 18 is released, the control arm 26 rotates the first idler plate 50 so as to bias the first idler pulley 52 into the flexible drive belt 88. The brake connecting rod rotates the brake plate 70 so as to disengage the brake band 72 from the brake drum 76. As can be seen, the brake mechanism 40 has been disengaged in the forward position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A lawn mower device comprising:
   a drive configured to rotate a shaft in a first and a second direction;
   a drive pulley coupled to the shaft;
   a driven wheel coupled to the drive pulley by a drive belt;
   a tensioning system coupled to the drive belt, the tensioning system having a first idler plate configured to bias a first idler pulley against the drive belt when the drive is rotating the shaft in the first direction and a second idler plate configured to bias a second idler pulley against the drive belt when the drive is rotating the shaft in the second direction;
   a brake mechanism coupled to the tensioning system, said brake mechanism configured to resist the rotation of the driven wheel; and
   a lockout mechanism configured to resist inadvertent application of the brake when the drive is rotated in the second direction.

2. The lawn mower device according to claim 1 wherein the first idler plate is coupled to a control handle.

3. The lawn mower according to claim 1 wherein the first and second idler plates are rotatably coupled to a frame.

4. The lawn mower according to claim 3 wherein the rotation of the first idler plate to bias the first idler pulley into the drive belt rotates a brake plate so as to disengage a brake component.

5. The lawn mower according to claim 4 further comprising a spring coupled to one of the first or the second idler plates, said spring configured to position the tensioning system such that the first idler pulley is biased the tension belt.

6. The lawn mower according to claim 5 wherein said spring is configured to position the tensioning system to disengage the brake mechanism.

7. The mower system according to claim 1 wherein said brake mechanism comprises a brake drum coupled to the driven wheel.

8. The mower system according to claim 7 wherein said brake mechanism further comprises a friction belt disposed about said brake drum and a first member being operably coupled to the first idler plate, wherein movement of the first member actuates the brake.

9. The mower system according to claim 7 further comprising a brake plate, rotationally fixed to a frame, said brake plate being coupled to said friction belt.

10. A lawn mower comprising:
    a drive mechanism configured to drive a shaft in a first and second direction;

a pulley coupled to the shaft;

a flexible drive member coupled to the pulley;

a driven wheel coupled to the flexible drive member;

a tension system having a first tensioning means for applying tension to a first slack side of the flexible drive member when the drive shaft is driven in the first direction and a second means for applying tension to a second slack side of the flexible drive member when the drive shaft is driven in a second direction;

a brake system operable to inhibit the rotation of the driven wheel, said brake system being actuated by said tension system; and a brake lockout coupled to the second means for applying tension, the brake lockout configured to restrict application of the brake system when the drive shaft is rotated in the second direction.

11. The mower according to claim 10 wherein said brake system comprises a friction member configured to engage a surface coupled to the driven wheel, and a first member coupled to the friction member, a first member configured to be actuatable by the tension system to engage the surface.

12. The mower according to claim 11 wherein said first member is rotatably coupled to a frame.

13. The mower according to claim 12 wherein the brake system comprises the friction member, said friction member being coupled to the tension system, said first member being configured to apply forces to a second member.

14. The mower according to claim 13 further comprising a spring coupled to the second member.

15. The mower according to claim 14 wherein said tension system comprises a first idler plate configured to bias a first idler pulley against the flexible drive member.

16. The mower according to claim 15 wherein said tensioning mechanism comprises a second idler plate configured to bias a second idler pulley against the flexible drive member.

17. A lawn mower comprising:

a drive mechanism configured to drive a shaft in a first and second direction;

a pulley coupled to the shaft;

a flexible drive member coupled to the pulley;

a driven wheel coupled to the flexible drive member;

a tension system having a first tensioning means for applying tension to a first slack side of the flexible drive member when the drive shaft is driven in the first direction and a second means for applying tension to a second slack side of the flexible drive member when the drive shaft is driven in a second direction;

a brake system operable to inhibit the rotation of the driven wheel, said brake system being actuated by said tension system;

a brake lockout coupled to the second means for applying tension, the brake lockout configured to restrict application of the brake system when the drive shaft is rotated in the second direction;

a connection member disposed between a first idler plate and the brake lockout, wherein the rotation of the first idler plate rotates the brake lockout, wherein said brake system comprises a friction member configured to engage a surface coupled to the driven wheel, and a first member coupled to the friction member, a first member configured to be actuatable by the tension system to engage the surface and wherein said first member is rotatably coupled to a frame and wherein the brake system comprises the friction member, said friction member begin coupled to the tension system, said first member being configured to apply forces to a second member and wherein said tension system comprises the first idler plate configured to bias a first idler pulley against the flexible drive member and wherein said tensioning mechanism comprises a second idler late configured to bias a second idler pulley against the flexible drive member, the mower further comprising a spring coupled to the second member.

18. The mower according to claim 17 wherein rotation of the second idler plate toward the flexible drive rotates the lockout mechanism toward the first member.

19. The mower according to claim 10 further comprising a first moveable handle functionally coupled to the tensioning mechanism, and a second fixed handle configured to limit the travel of the first handle.

20. The mower according to claim 19 wherein the second fixed handle is adjustable from a first to a second position.

* * * * *

UNITED STATES PATENT AND TRADEMARK OFFICE
CERTIFICATE OF CORRECTION

PATENT NO.    : 6,834,485 B2
DATED         : December 28, 2004
INVENTOR(S)   : Merlin H. Gandrud It is certified that error appears in the above-identified patent and that said Letters Patent is hereby corrected as shown below:

<u>Title page,</u>
Item [75], Inventor, should be -- Merlin H. Gandrud --.

Signed and Sealed this

Tenth Day of May, 2005

JON W. DUDAS
*Director of the United States Patent and Trademark Office*